United States Patent
Arinaga et al.

(10) Patent No.: US 7,210,450 B2
(45) Date of Patent: May 1, 2007

(54) INTAKE CONTROL APPARATUS AND METHOD FOR INTERNAL COMBUSTION ENGINE

(75) Inventors: Tsuyoshi Arinaga, Kanagawa (JP); Ryosuke Hiyoshi, Kanagawa (JP); Shin Ishizaki, Kanagawa (JP); Shinichi Takemura, Yokohama (JP); Takanobu Sugiyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/252,711

(22) Filed: Oct. 19, 2005

(65) Prior Publication Data

US 2006/0090728 A1 May 4, 2006

(30) Foreign Application Priority Data

Nov. 2, 2004 (JP) ............................. 2004-318653
Nov. 24, 2004 (JP) ............................. 2004-338286

(51) Int. Cl.
*F02D 41/16* (2006.01)
*F01L 1/344* (2006.01)

(52) U.S. Cl. ............................. 123/339.19; 123/90.17; 123/339.24

(58) Field of Classification Search ............ 123/90.11, 123/90.15–90.18, 339.1, 339.14, 339.19, 123/339.22, 345–348

See application file for complete search history.

(56) References Cited

U.S. PATENT DOCUMENTS

| | | | |
|---|---|---|---|
| 5,765,528 A * | 6/1998 | Kamimaru | 123/339.19 |
| 6,039,026 A | 3/2000 | Shiraishi et al. | |
| 6,520,131 B2 * | 2/2003 | Takahashi et al. | 123/90.17 |
| 6,755,182 B1 * | 6/2004 | Kolmanovsky et al. | 123/90.15 |
| 6,959,692 B2 * | 11/2005 | Song et al. | 123/90.15 |
| 7,021,281 B2 * | 4/2006 | Ruiz | 123/339.19 |

FOREIGN PATENT DOCUMENTS

| | | |
|---|---|---|
| JP | 11-36896 A | 2/1999 |
| JP | 11-93736 A | 4/1999 |
| JP | 2002-256905 A | 9/2002 |
| JP | 2003-74318 A | 3/2003 |

\* cited by examiner

*Primary Examiner*—T. M. Argenbright
(74) *Attorney, Agent, or Firm*—Foley & Lardner LLP

(57) ABSTRACT

An intake control apparatus for an internal combustion engine includes a variable valve operating mechanism capable of varying a lift and operation angle of an intake valve continuously and a control unit that controls an intake air amount by varying the lift and operation angle of the intake valve in accordance with an operating condition of the engine. The control unit has a learning section that learns a controlled position of the variable valve operating mechanism at a learning position that is a predetermined lift and operation angle located between a minimum value and a maximum value of the lift and operation angle that can be actually realized by the variable valve operating mechanism.

17 Claims, 15 Drawing Sheets

OPERATION ANGLE MAP

MAXIMUM LIFT PHASE MAP

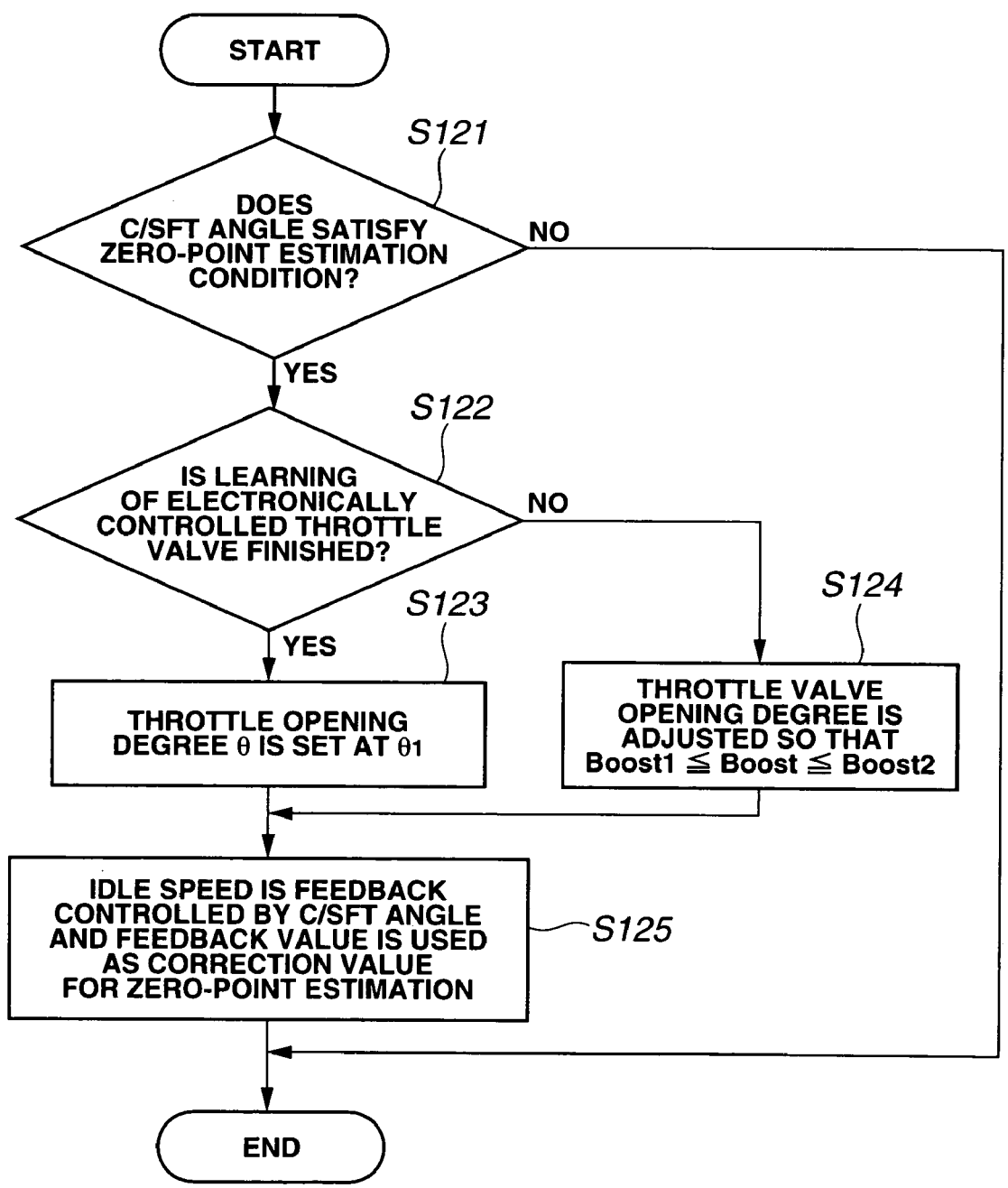

INTAKE CONTROL APPARATUS AND METHOD FOR INTERNAL COMBUSTION ENGINE

BACKGROUND OF THE INVENTION

The present invention relates to an intake control apparatus and method for an internal combustion engine, which is configured to control an intake air amount by variable control of a lift and operation angle of an intake valve, and particularly to a technique for learning a controlled position of a variable valve operating mechanism for variable control of the lift and operation angle of the intake valve. The present invention further relates to an intake control apparatus and method for controlling an idle speed of an internal combustion engine.

In a gasoline engine, an intake air amount is generally controlled by a throttle valve disposed in an intake passage. However, as is well known, such an intake control encounters a problem that there is caused a large pumping loss particularly under middle to low load conditions where the opening degree of the throttle valve is small. To solve such a problem, it has been tried to develop a technique of controlling the intake air amount without depending upon the throttle valve and it has been proposed, by using such a technique, to realize an arrangement in which an intake system is not provided with a throttle valve similarly to a diesel engine, i.e., a so-called throttle-less arrangement.

In Unexamined Japanese Patent Publications Nos. 2002-256905 and 2003-74318, which are assigned to the same assignee of this application, is disclosed a variable valve operating device consisting of a first variable valve operating mechanism capable of varying a lift and operation angle simultaneously and continuously and a second variable valve operating mechanism capable of varying a maximum lift phase (i.e., a phase at which the lift becomes maximum). By such a variable valve operating device, an amount of intake air to b e supplied to cylinders can be controlled independently of the opening degree of the throttle valve, and particularly under a low load condition a so-called throttle-less operation or an operation where the opening degree of the throttle valve is kept sufficiently large can be realized, thus reducing a pumping loss considerably. Further, by controlling so that a valve lift amount is so small at idle, the intake air amount can be controlled accurately.

In the meantime, in an arrangement of controlling the intake air amount by variable control of the valve lift characteristics, a vacuum is not produced in the intake system if the arrangement is of the completely throttle-less type, i.e., of the type not provided with a throttle valve. This causes a new problem that conventional systems such as a system for circulating blow-by gas or purge gas from an evaporator can not be used or a vacuum that is used as a drive source for various actuators cannot be obtained. To solve such a problem, it has been proposed to dispose a so-called electronically controlled throttle valve as a vacuum control valve in an intake passage to realize, in combination with an opening degree control of the throttle valve, a control of an intake air amount through control of the valve lift characteristics of the intake valve while obtaining a predetermined vacuum in the intake passage.

Further, in Unexamined Japanese Patent Publication No. 11-36896 corresponding to U.S. Pat. No. 6,039,026 is disclosed such a technique as follows. Namely, in an arrangement for controlling an amount of intake air to be supplied to an internal combustion engine by using a throttle valve, a fully closed position of a throttle valve is controlled mechanically by using a stopper mechanism. An opening degree of the throttle valve detected by an throttle position sensor when the throttle valve is positioned at such a controlled position is learned as a fully closed position with a view to improving the accuracy in control of the throttle valve.

Further, in an automotive gasoline engine, as is well known, an intake air amount at idle is adjusted based on an actual engine speed by controlling an opening degree of an idle control valve disposed in a secondary air passage that bypasses the throttle valve and a feedback control is performed so that the engine speed is held at a target idle speed. It is also known that on the basis of a feedback control value during the feedback control, an intake air amount at idle for obtaining the target idle speed (e.g., an opening degree correction value of the idle control valve) is learned to perform a control by using a learned value with a view to improving the responsiveness of the feedback control and the accuracy of the open-loop control.

Unexamined Japanese Patent Publication No. 11-93736 discloses a similar idle speed control that is realized by controlling an opening degree of an electronically controlled throttle valve.

SUMMARY OF THE INVENTION

If in an arrangement for controlling an intake air amount by varying a lift and operation angle of an intake valve as disclosed in Unexamined Japanese Patent Publications Nos. 2002-256905 and 2003-74318, a minimum value of a lift and operation angle that can be actually realized by the variable valve operating mechanism is determined as a target value at idle and the minimum value is controlled by a stopper mechanism, there is a possibility that a variation of an actual valve lift due to various factors may cause an insufficient intake air amount at idle and stoppage of an engine. Accordingly, it is not suitable to control the minimum value by the stopper mechanism disclosed in Unexamined Japanese Patent Publication No. 11-36896.

Further, in an arrangement of controlling the intake air amount by controlling the valve lift characteristics of the intake valve, it may be difficult to obtain a conventional idle speed control by an opening degree of a throttle valve or the like since the intake air is subject to restriction by the intake valve disposed downstream of the throttle valve.

Further, a variation in an amount of intake air to be supplied to a cylinder in response to a control by an intake air amount control portion is caused at a higher responsiveness as the intake air amount control portion is located closer to the cylinder. Accordingly, it is desirable to perform correction of an intake air amount for disturbance or deterioration in combustion for each cycle at a place located as downstream as possible.

Further, the temperature of intake air at an inlet portion of an intake system is determined depending upon an environmental condition (temperature of atmosphere, etc.). However, the temperature of intake air actually drawn into the cylinder is mainly influenced by the heat which the intake air receives from coolant of the engine and less influenced by the environmental condition.

It is accordingly an object of the present invention to provide an intake control apparatus and method for an internal combustion engine that is free from the above-noted problems inherent in the prior art devices.

It is a further object of the present invention to provide the intake control apparatus and method of the foregoing character that can provide an accurate intake air control in accordance with an engine operating condition, particularly at idle.

To achieve the above objects, there is provided according to an aspect of the present invention an intake control apparatus for an internal combustion engine comprising a variable valve operating mechanism capable of varying a lift and operation angle of an intake valve continuously, and a control unit that controls an intake air amount by varying the lift and operation angle of the intake valve in accordance with an operating condition of the engine, the control unit having a learning section that learns a controlled position of the variable valve operating mechanism at a learning position that is a predetermined lift and operation angle located between a minimum value and a maximum value of the lift and operation angle that can be actually realized by the variable valve operating mechanism.

According to a further aspect of the present invention, there is provided an intake control apparatus for an internal combustion engine comprising a variable valve operating mechanism capable of varying a lift and operation angle of an intake valve continuously, and a control unit that controls an intake air amount by varying the lift and operation angle of the intake valve in accordance with an operating condition of the engine, the control unit including an idle determining section that determines whether the engine is in an idle condition, a feedback control section that feedback controls the variable valve operating mechanism so that an actual engine speed becomes equal to a target idle speed when the engine is in the idle condition, and a reference position estimation section that estimates a reference position of the variable valve operating mechanism on the basis of a controlled position of the variable valve operating mechanism that is feedback controlled by the feedback control section.

According to a further aspect of the present invention, there is provided an intake control method for an internal combustion engine having a variable valve operating mechanism capable of varying a lift and operation angle of an intake valve continuously and a control unit that controls an intake air amount by varying the lift and operation angle of the intake valve in accordance with an operating condition of the engine, the intake control method comprising learning a controlled position of the variable valve operating mechanism at a learning position that is a predetermined lift and operation angle located between a minimum value and a maximum value of the lift and operation angle that can be actually realized by the variable valve operating mechanism.

According to a further aspect of the present invention, there is provided an intake control method for an internal combustion engine having a variable valve operating mechanism capable of varying a lift and operation angle of an intake valve continuously and a control unit that controls an intake air amount by varying the lift and operation angle of the intake valve in accordance with an operating condition of the engine, the control method comprising determining whether the engine is in an idle condition, feedback controlling the variable valve operating mechanism so that an actual engine speed becomes equal to a target idle speed when the engine is in the idle condition, and estimating a reference position of the variable valve operating mechanism on the basis of a controlled position of the variable valve operating mechanism that is feedback controlled by the feedback control section.

BRIEF DESCRIPTION OF THE DRAWINGS

FIGS. 8A and 8B are views each showing a deviation of a learning value from a design value, wherein FIG. 8A shows an angular position of a control shaft in relation to torque and FIG. 8B shows a throttle valve opening degree in relation to torque;

FIG. 9 is a flowchart of a control according to a second embodiment of the present invention;

FIG. 16B is a side view of the stopper pin;

DESCRIPTION OF THE PREFERRED EMBODIMENTS

Figure 1:
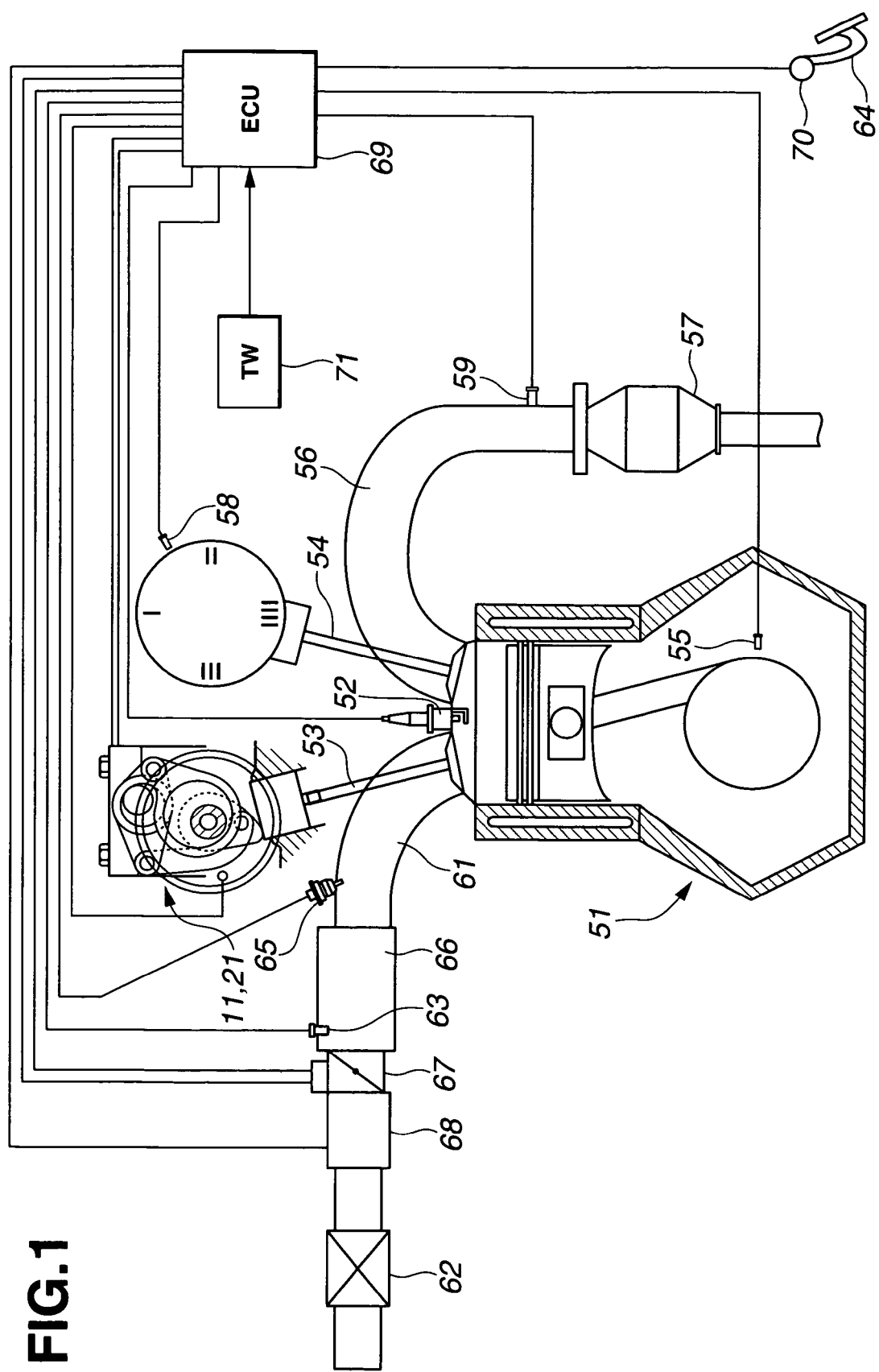
FIG. 1 is a schematic view of an intake control apparatus for an internal combustion engine to which the present invention is applied.

Referring to the drawings, embodiments of the present invention, that are applied to an automotive gasoline engine, will be described.

Referring first to FIG. 1, an internal combustion engine 51 that is a spark-ignited gasoline engine has a spark plug 52 at the center of a combustion chamber (no numeral) and further has an intake valve 53 and an exhaust valve 54. A crank angle sensor 55 is provided for detecting rotation of a crank shaft (no numeral). From a detection signal of crank angle sensor 55 is detected an engine speed.

An exhaust passage 56 is provided with a catalytic converter 57. Upstream of catalytic converter 57 is disposed an air/fuel ratio sensor 59 for detecting an exhaust air/fuel ratio. A valve operating device on the exhaust valve 4 side has a generally used structure that provides fixed valve lift characteristics and its camshaft is provided with a cylinder discriminating sensor 58 for discriminating a cylinder.

At an inlet portion of an intake port of each cylinder, that is a downstream side portion of intake passage 61, is provided a fuel injector 65 that injects fuel into each intake port. Intake passages 61 for respective cylinders are collected to an intake air collector 66. At the inlet side of intake air collector 66 is disposed an electronically controlled throttle valve 67 serving as a vacuum control valve. Electronically controlled throttle valve 67 has an actuator consisting of an electric motor and its opening degree is controlled by a control signal supplied thereto from an engine control unit (ECU) 69. In the meantime, electronically controlled throttle valve 67 has as an integral unit a sensor (not shown) for detecting an actual opening degree thereof, and on the basis of a detection signal thereof the opening degree of throttle valve 67 is closed-loop controlled to a target value. Further, on the upstream side of throttle valve 67 are provided an airflow meter 68 for detecting an air flow rate and an air cleaner 62. Intake air collector 66 is provided with a pressure sensor 63 for detecting a pressure inside thereof.

Further, there are provided an accelerator opening degree sensor 70 for detecting a depression (accelerator opening degree APO) of an accelerator pedal 64 that is operated by a vehicle driver and a coolant temperature sensor 71 for detecting an engine coolant temperature or a temperature of water (TW). Detection signals of those sensors are supplied to engine control unit 69 together with the detection signals of the above-described kinds of sensors. On the basis of those detection signals, engine control unit 69 controls a fuel injection amount and a fuel injection timing of fuel injector 65, an ignition timing of a spark plug 52, an opening degree of throttle valve 67 and the valve lift characteristics of variable valve operating mechanisms that will be described later.

Figure 2:
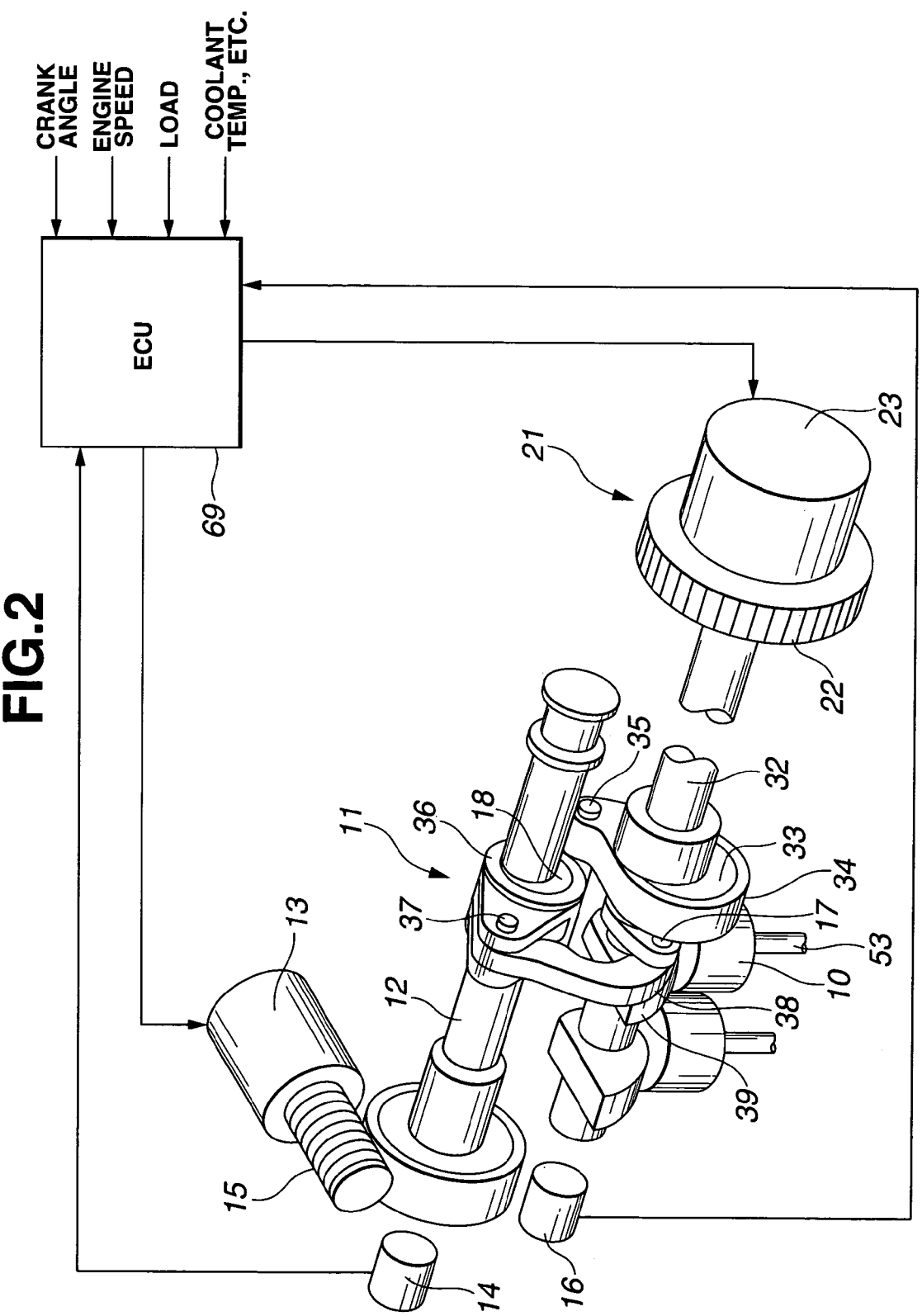
FIG. 2 is a perspective view of a variable valve operating mechanism utilized in the intake control apparatus of FIG. 1.

FIG. 2 shows a variable valve operating device for operating intake valve 53. The variable valve operating device includes a first variable valve operating mechanism 11 capable of varying a lift and operation angle of intake valve 53 continuously and a second variable valve operating mechanism 21 capable of varying a maximum lift phase continuously. First and second variable valve operating mechanisms 11, 21 and vacuum control valve 67 are controlled by control unit 69.

First variable valve operating mechanism 11 and second variable valve operating mechanism 21 are known as disclosed in the above-described Unexamined Japanese Patent Publications Nos. 2002-256905 and 2003-74318, and therefore only brief description will be made thereto.

First variable valve operating mechanism 11 for variably controlling the lift and operation angle of intake valve 53 includes drive shaft 32 driven by a crankshaft (not shown) of engine 1, circular drive cam 33 eccentrically and fixedly mounted on drive shaft 32 so as to be rotatable together with drive shaft 32, pivotal link 34 pivotally mounted on drive cam 33, control shaft 12 rotatably supported on a cylinder head (not shown) of engine 51, circular control cam 18 eccentrically and fixedly mounted on control shaft 12 so as to be rotatable together with control shaft 12, rocker arm 36 pivotally mounted on control cam 18 and having an end portion pivotally connected to a protruded arm portion of pivotal link 34 by way of a connecting pin 35, an oscillation cam 39 fixedly mounted on drive shaft 32 for driving intake valve 53 by way of valve lifter 10, and connecting link 38 having an upper end portion pivotally connected to another end portion of rocker arm 36 by way of connecting pin 37 and a lower end portion pivotally connected to oscillation cam 39 by way of connecting pin 17.

Drive cam 33 has a cylindrical outer periphery which is eccentric with drive shaft 32. Control cam 18 has a cylindrical outer periphery which is eccentric with control shaft 12. Accordingly, an oscillation center of rocker arm 36 varies depending upon a variation of an angular position of control shaft 12.

Oscillation cam 39 has at a lower side thereof a basic circular surface and a cam surface extending continuously from the basic circular surface so as to generate a predetermined curve. The basic circular surface and cam surface are selectively brought into contact with the upper surface of valve lifter 10 in dependence upon an oscillated position of oscillation cam 39. The basic circular surface defines a reference circular range for making the valve lift zero. When oscillation cam 39 is oscillated to bring the cam surface into contact with valve lifter 10, intake valve 53 is pushed down against a valve spring reaction force to lift intake valve 53 gradually.

Actuator 13 for control of lift and operation angle is disposed at an end of control shaft 12. Control shaft 12 is driven by actuator 13 so as to be rotatable within a predetermined angular range. Actuator 13, for example, consists of an electric motor for driving control shaft 12 by way of worm gear 15 and is controlled by a control signal supplied thereto from control unit 69. The angular position of control shaft 12 is detected by control shaft sensor 14.

By first variable valve operating mechanism 11 described above, the lift and operation angle of intake valve 53 are both varied simultaneously and continuously depending upon a variation of the angular position of control shaft 12. Depending upon a variation of the lift and operation angle, the opening and closing timings of intake valve 53 are varied symmetrically about the maximum lift phase or the center phase of the operation angle. The amount of lift and operation angle is determined simply by the angular position of control shaft 12 so that the detection value of control shaft sensor 14 represents the actual lift and operation angle at that time.

On the other hand, second variable valve operating mechanism 21 for variably controlling the maximum lift phase of intake valve 53 includes sprocket 22 disposed at a front end of drive shaft 32 and phase control actuator 23 for causing sprocket 22 and drive shaft 32 to rotate relative to each other within a predetermined angular range. Sprocket 22 is connected to the crankshaft by way of a timing chain or belt (not shown) so as to be rotatable in timed relation with the crankshaft. Phase control actuator 23 in this embodiment is constituted by a hydraulic rotary actuator and controlled by a hydraulic control valve (not shown) in response to a control signal from control unit 69. By the operation of phase control actuator 23, sprocket 22 and drive shaft 32 are rotated relative to each other to thereby advance or retard the maximum lift phase of intake valve 53. In this connection, the lift characteristic curve itself is not changed but is moved in its entirety so as to allow the maximum lift phase to advance or retard. Further, the maximum lift phase is also varied continuously. The controlled condition of second variable valve operating mechanism 21 is detected by drive shaft sensor 16 that is responsive to the angular position of drive shaft 32.

Figure 3:
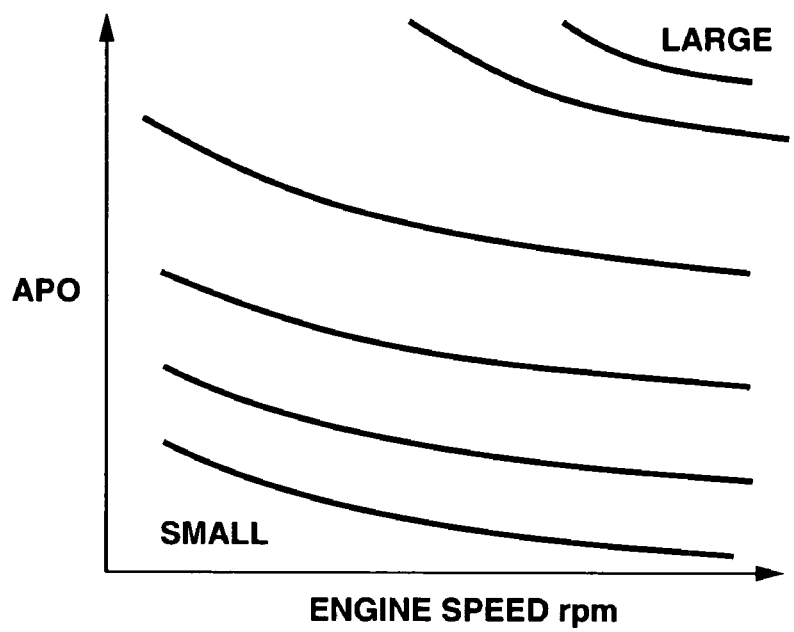
FIG. 3 is a view showing lift and operation angle target value characteristics.
Figure 4:
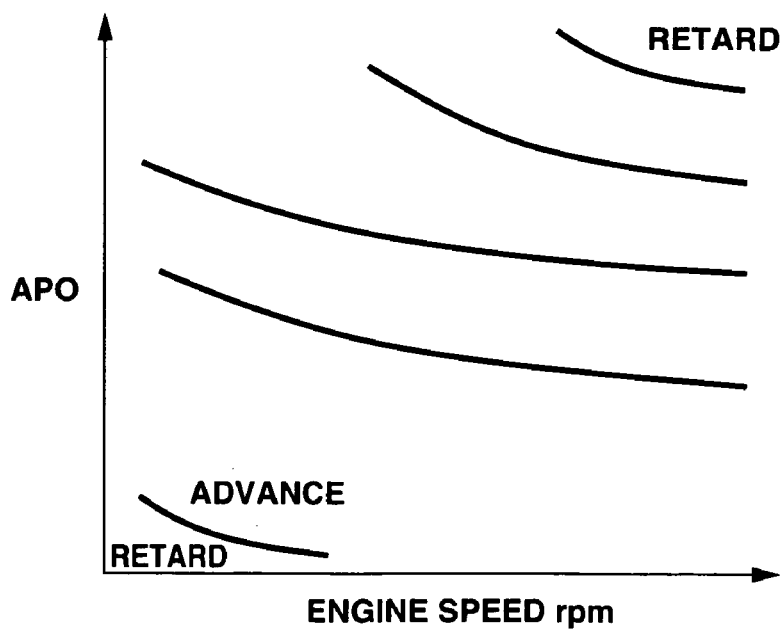
FIG. 4 is a view showing maximum lift phase target value characteristics.
Figure 5:
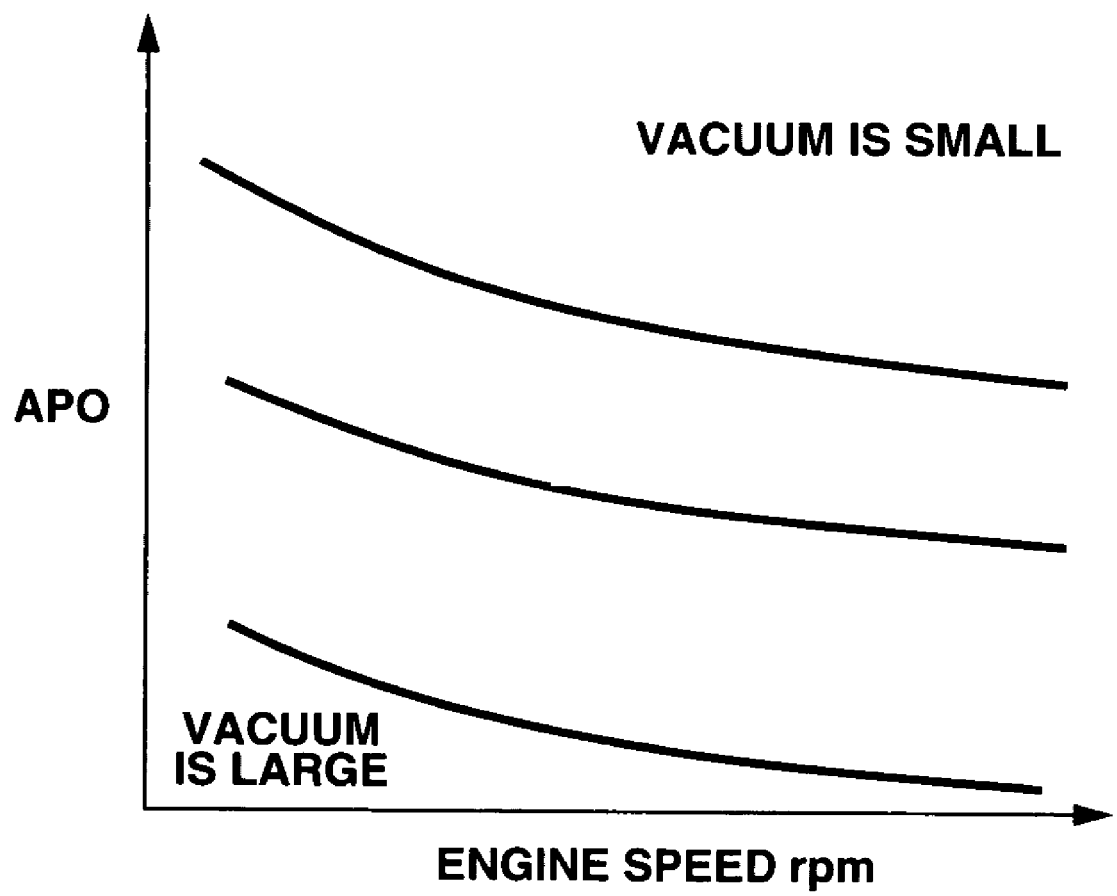
FIG. 5 is a view showing intake vacuum (boost) target value characteristics.

Accordingly, by combining the control provided by first and second variable valve operating mechanisms 11, 21, the opening and closing timings of intake valve 53 can be variably controlled together with the lift amount of the same, and therefore the amount of intake air drawn into the cylinder can be controlled in accordance with the load of the engine. Specifically, as shown in FIGS. 3 to 5, a lift and operation angle target value, maximum lift phase target value and intake vacuum (Boost) target value are allotted to engine speed and engine load (accelerator pedal opening degree APO), and first and second variable valve operating mechanisms 11, 21 and electronically controlled throttle valve 76 are controlled in accordance with the allotment.

An idle learning control that is executed in control unit 69 according to the present invention will be described with reference to the flowchart of FIG. 6.

In step S101, it is determined whether control shaft (abbreviated as C/SFT) 12 of first variable valve operating mechanism 11 is at a reference position for control, i.e., in a zero-point estimation condition (i.e., condition of estimating that control shaft 12 is in a zero-point). Specifically, this is determined in accordance with a flag that is set by a flowchart of FIG. 7, which will be described later.

If it is determined that control shaft 12 is in the zero-point estimation condition, the program proceeds to step S102. If not in the zero-point estimation condition, the routine is ended.

Figure 8A:
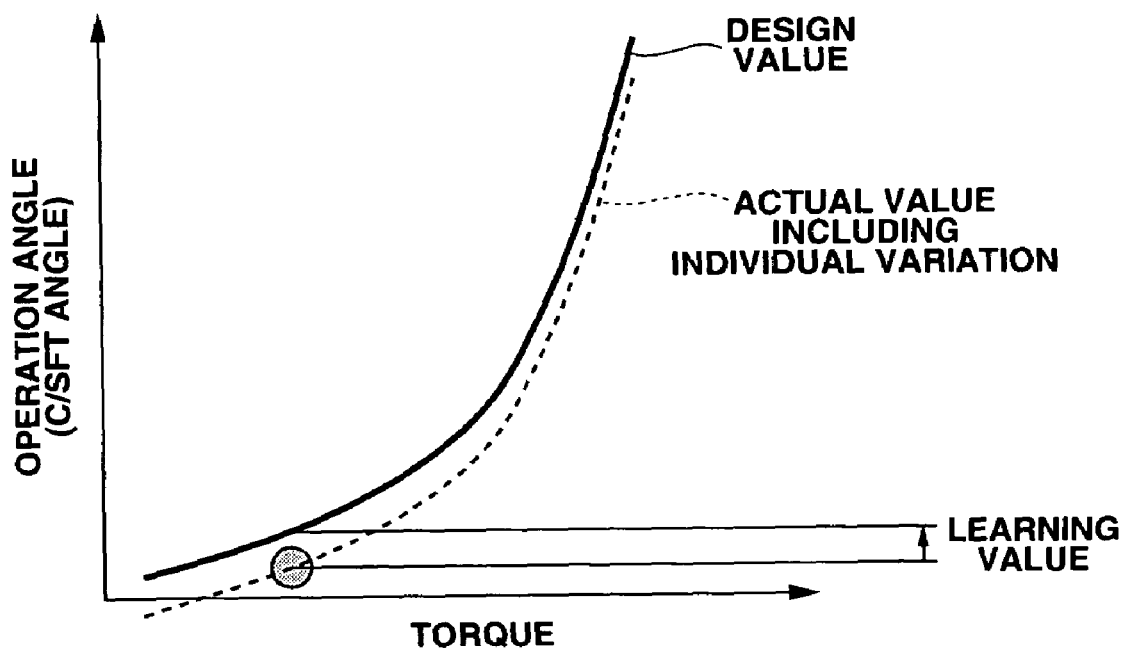
Figure 8B:
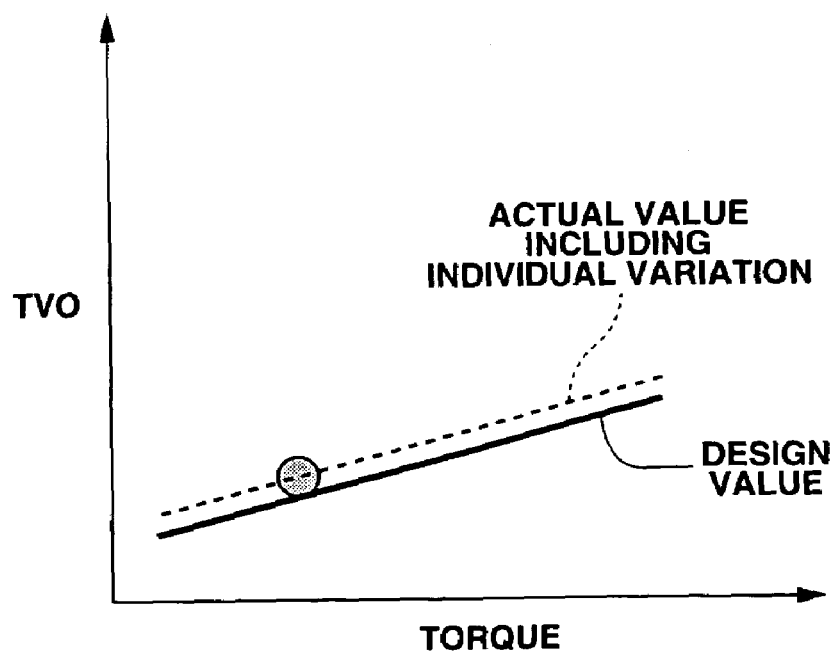

In step S102, it is determined whether a learning about an opening degree control of electronically controlled throttle valve 67 disposed on the upstream side of intake valve 53 (e.g., learning of a reference opening degree position) is finished. If the learning of throttle valve 67 is finished, the program proceeds to step S103 where an opening degree θ of throttle valve 67 is set at a predetermined value θ1. Then, in step S104, by a feedback control of control shaft 12 in accordance with a deviation of an actual engine speed from a target engine speed, an idle speed is corrected so as to be within a predetermined range, and thereafter an angle of control shaft 12 at that time is determined as a learning value. The learning value is stored in control unit 69 and is used as a correction value of an angle of control shaft 12 in the control of first variable valve operating mechanism 11 thereafter. Namely, the above-described learning value indicates an amount of separation or deviation from a design value as shown in FIGS. 8A and 8B.

Figure 7:
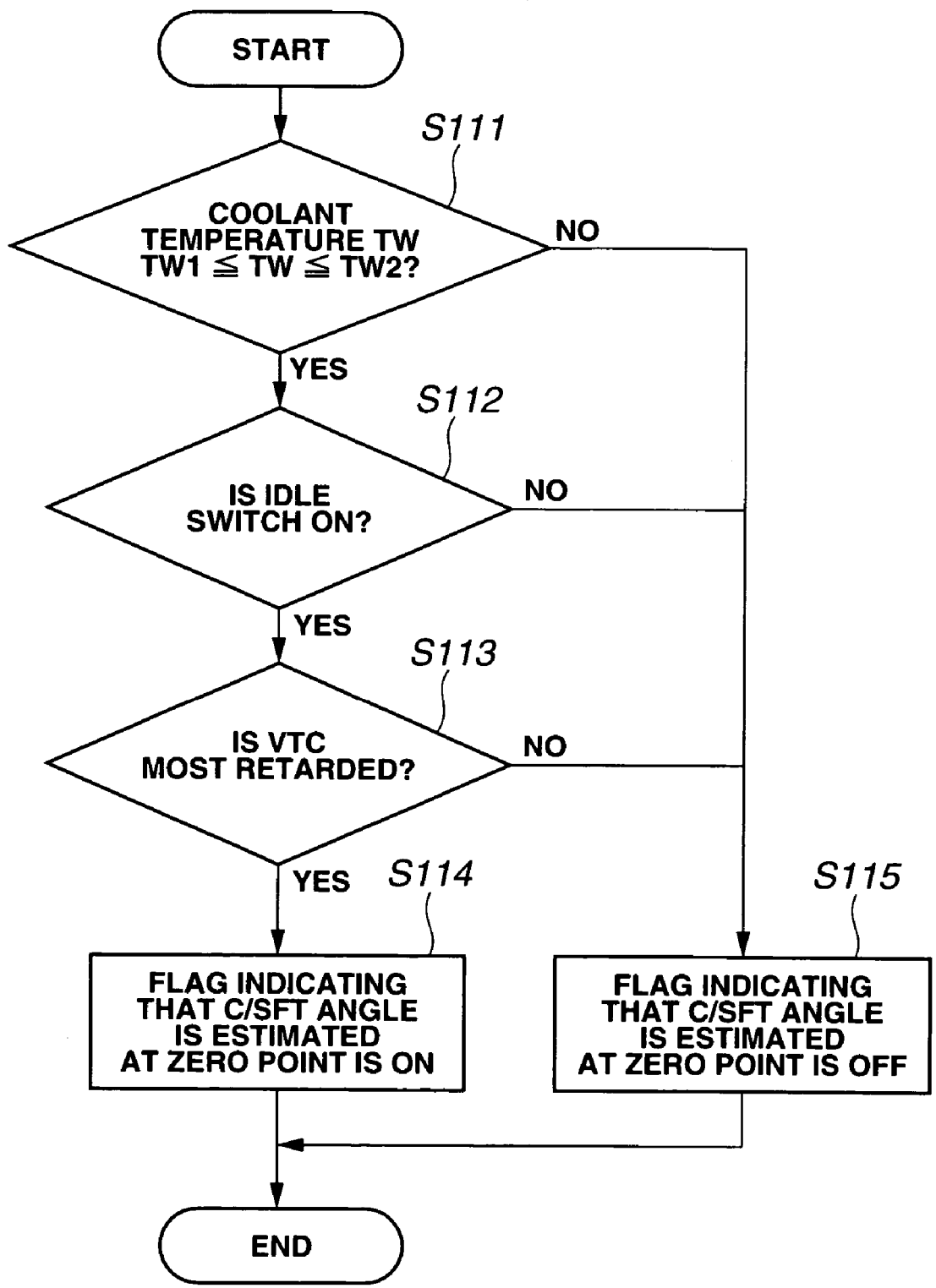
FIG. 7 is a flowchart of another control according to the first embodiment.

FIG. 7 is a flowchart of a control that is executed in control unit 69 for determining the above-mentioned zero-point estimation condition.

In step S111, it is determined whether warm-up of the engine has been completed. Specifically, it is determined that warm-up of the engine has been completed when a detected coolant temperature TW is within a predetermined range, i.e., TW1≦TW≦TW2 and the program proceeds to step S112. In step S112, it is determined whether the engine is in an idle condition (i.e., whether an idle switch is ON). Specifically, the engine is determined to be in an idle condition when two conditions, i.e., a condition of the engine speed being equal to or lower than a predetermined value and a condition of the accelerator opening degree APO being zero are satisfied. Then, in step S113, it is determined whether second variable valve operating mechanism (abbreviated as VTC) 21 is in a most retarded condition.

If the answers in the above-described steps S112 to S114 are all affirmative, the program proceeds to step S114 where a zero-point estimation flag is set ON. On the other hand, if one of the answers is negative, the program proceeds to step S115 where the zero-point estimation flag is set OFF.

The above-described steps S112 to S114 are provided for getting necessary learning conditions and thereby preventing an erroneous determination on a learning value. Accordingly, while, for example, in step S113 in the above-described embodiment it is performed a determination on the most retarded condition, it may be performed in place thereof to determine whether a deviation amount with respect to a target control is within a predetermined range.

Since in this embodiment, as described above, the lift and operation angle of intake valve 53 is varied by means of first variable valve operating mechanism 11 for thereby controlling idle speed of the engine, it becomes possible to realize a highly responsive idle speed control. Further, since the estimation and learning of the zero-point is performed after warm-up of the engine, i.e., after the intake air amount has become relatively smaller and when second variable valve operating mechanism 21 is in a most retarded position, it becomes possible to learn the reference position of control shaft 12 accurately and therefore the accuracy in control of the lift and operation angle thereafter is improved. Furthermore, since the estimation and learning of the zero-point is performed under the condition where the learning of electronically controlled throttle valve 67 is completed and the opening degree θ thereof is equal to a predetermined value θ1, it never undergoes an influence due to an error in the control of the opening degree of throttle valve 67.

Then, with reference to the flowchart of FIG. 9, a control that is executed in control unit 69 according to the second embodiment will be described. This embodiment is configured to switch the learning control at idle depending upon whether the learning about the opening degree control of electronically controlled throttle valve 67 (e.g., the learning of a reference opening degree) is completed.

Figure 6:
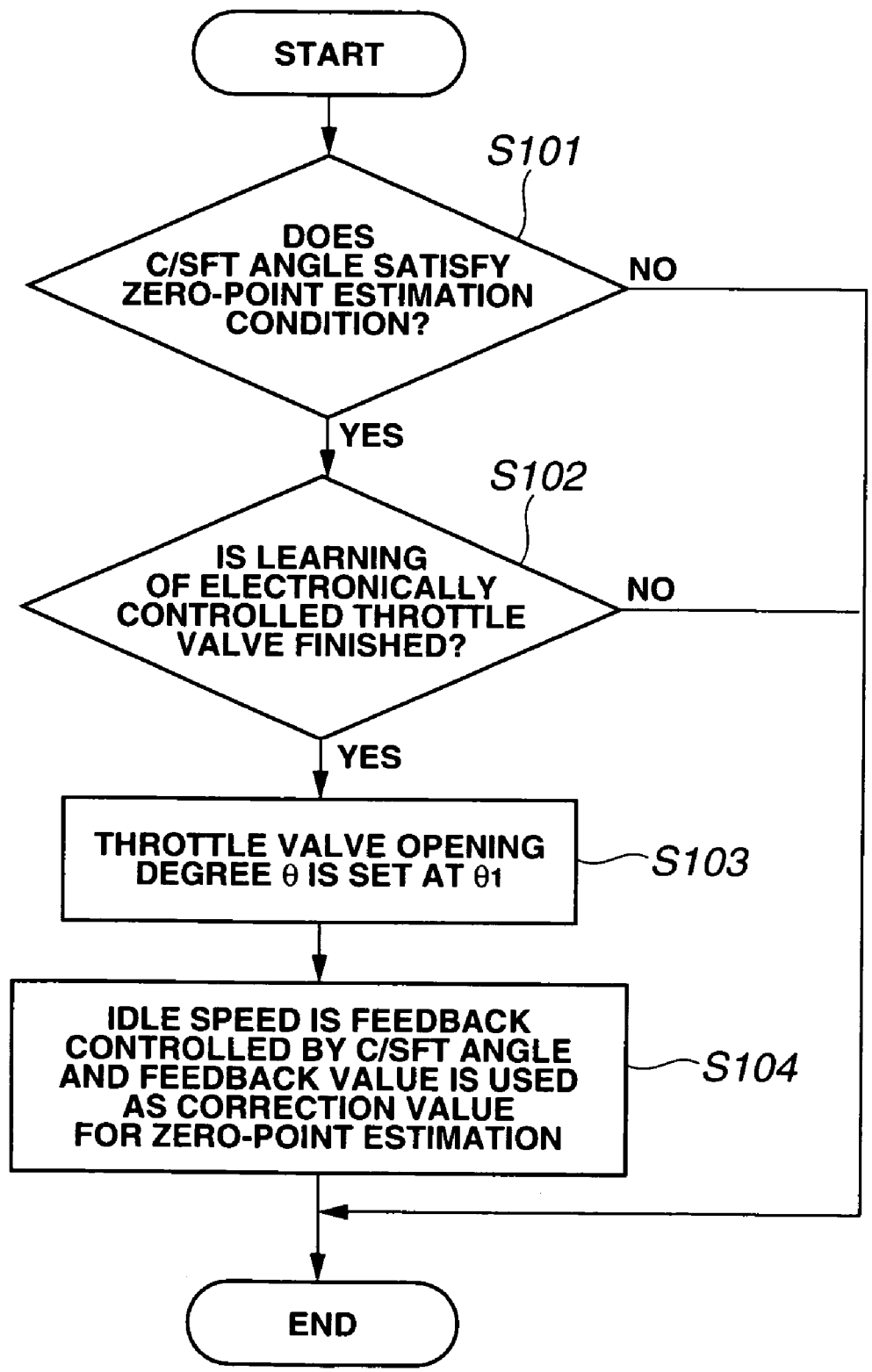
FIG. 6 is a flowchart of a control according to a first embodiment of the present invention.

The control in steps S121 and S122 is the same as that in steps S101 and S102 of FIG. 6 in the first embodiment, i.e., in step S121 the determination on the zero-point estimation condition is made and in step S122 the determination on whether the learning of electronically controlled throttle valve 67 is completed is made.

If it is determined in step S122 that the learning of electronically controlled throttle valve 67 has been completed, it is performed in step S123, similarly to the first embodiment, to set the throttle opening at a predetermined value θ1. Then, in step S125, by a feedback control of control shaft 12 in accordance with a deviation of the actual engine speed from a target idle speed, the idle speed is corrected so as to be within a predetermined range and thereafter the angle of control shaft 12 at that time is determined as a learning value. Namely, the learning value indicates an amount of deviation from the design value.

On the other hand, if it is determined in step S122 that the learning of throttle valve 67 has not been completed, the program proceeds to step S124 where the opening degree of throttle valve 67 is adjusted so that the intake vacuum is within a predetermined range (i.e., Boost 1≦Boost≦Boost 2) and thereafter the program proceeds to step S125. In step S125, as described above, the feedback control of control shaft 12 is performed and the angle of control shaft 12 at that time is determined as a learning value. Accordingly, since in this case the estimation and learning of the zero-point is performed under the condition where the intake vacuum relating to the intake air amount is kept at a predetermined value, without being influenced by the accuracy in the control of the opening degree of throttle valve 67, the accuracy in the estimation and learning can be improved.

In this manner, in this embodiment, the learning control at idle is switched depending upon whether the learning of electronically controlled throttle valve 67 is completed. By this, it becomes possible to accomplish the estimation and learning of the zero-point rapidly while eliminating an error caused with relation to a control accuracy of electronically controlled throttle valve 67. Namely, if the learning of the zero-point of the vacuum control valve itself is finished, it becomes possible to exclude an influence caused by an individual variation of the vacuum control valve and therefore the learning and estimation of the reference position for control can be performed rapidly under the condition where the opening degree of the vacuum control valve is maintained at a predetermined value. In contrast to this, if the learning of the vacuum control valve is not finished, the estimation and learning of the reference position for control can be performed accurately by being performed under the condition where the intake vacuum is controlled to a predetermined value.

Figure 10:
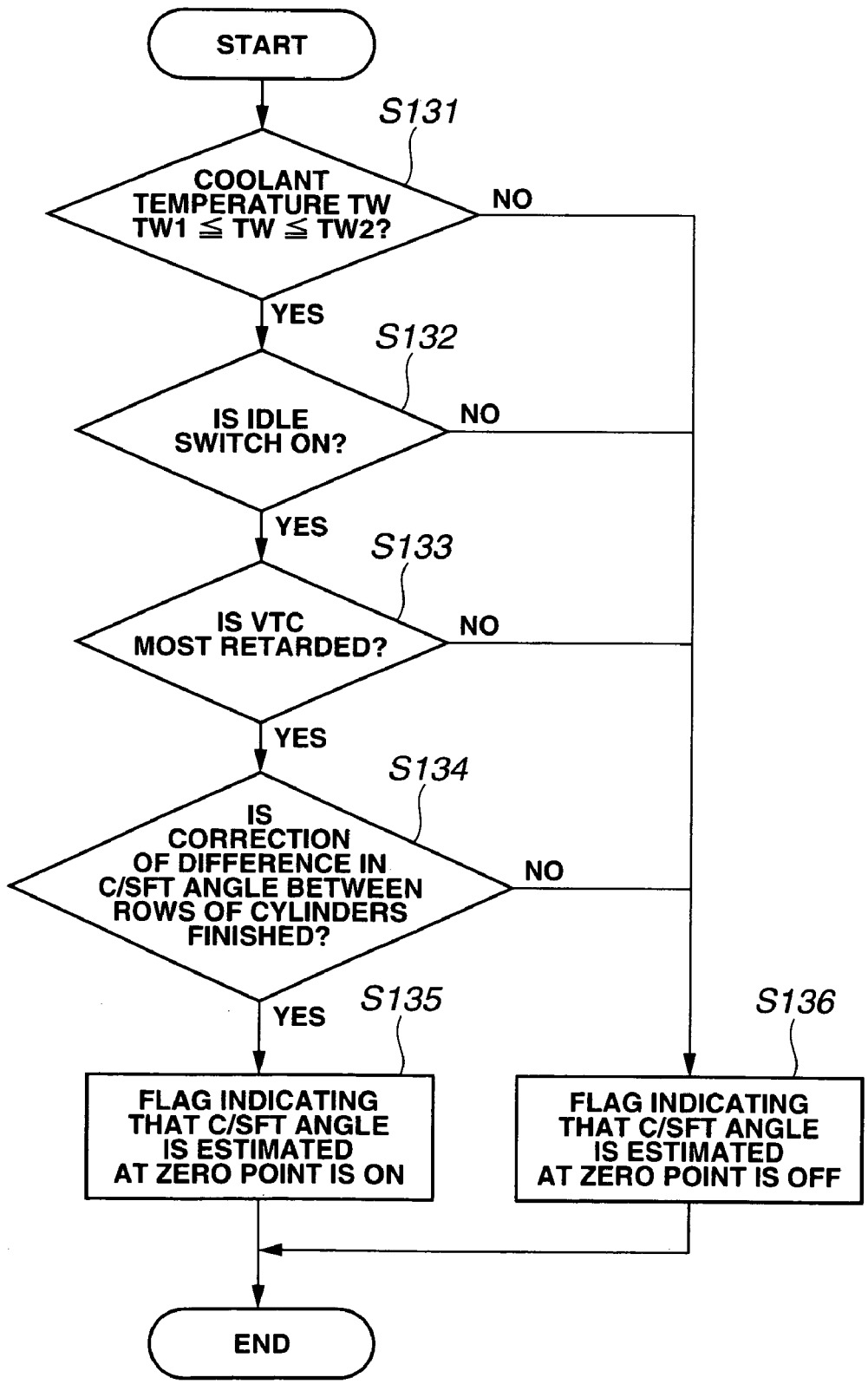
FIG. 10 is a flowchart of a control according to a third embodiment of the present invention.

Then, with reference to the flowchart of FIG. 10, a control that is executed in control unit 69 according to the third embodiment will be described. This embodiment is an application of the present invention to, for example, a V-type internal combustion engine in which first and second variable valve operating mechanisms 11, 21 are provided to each of banks, so that in place of the routine of FIG. 7 in the first embodiment the routine of FIG. 10 is used.

The control in steps S131 to S133 is substantially the same as that in steps S111 to S113, i.e., in step S131 it is determined whether warm-up of the engine has been completed, in step S132 it is determined whether the engine is in an idle condition, and in step S133 second variable valve operating mechanism (VTC) 21 is in a most retarded condition. Then, in this embodiment, in step S134 it is further determined whether correction of a difference in the control position of first and second variable valve operating mechanisms 11, 21 between the banks is completed and after completion of that correction the program proceeds to step S135 where the flag of the zero-point estimation condition is set ON. On the other hand, if the determination of one of steps S131 to S134 is negative, the program proceeds to step S136 where the flag is set OFF. Except for the above, this embodiment is substantially the same as the first embodiment.

By the above control, the estimation and learning of the zero-point of first and second variable valve operating mechanisms 11, 21 can be performed after the difference in the control of first and second variable valve operating mechanisms 11, 21 between the banks is eliminated and therefore can be performed more accurately.

Figure 11:
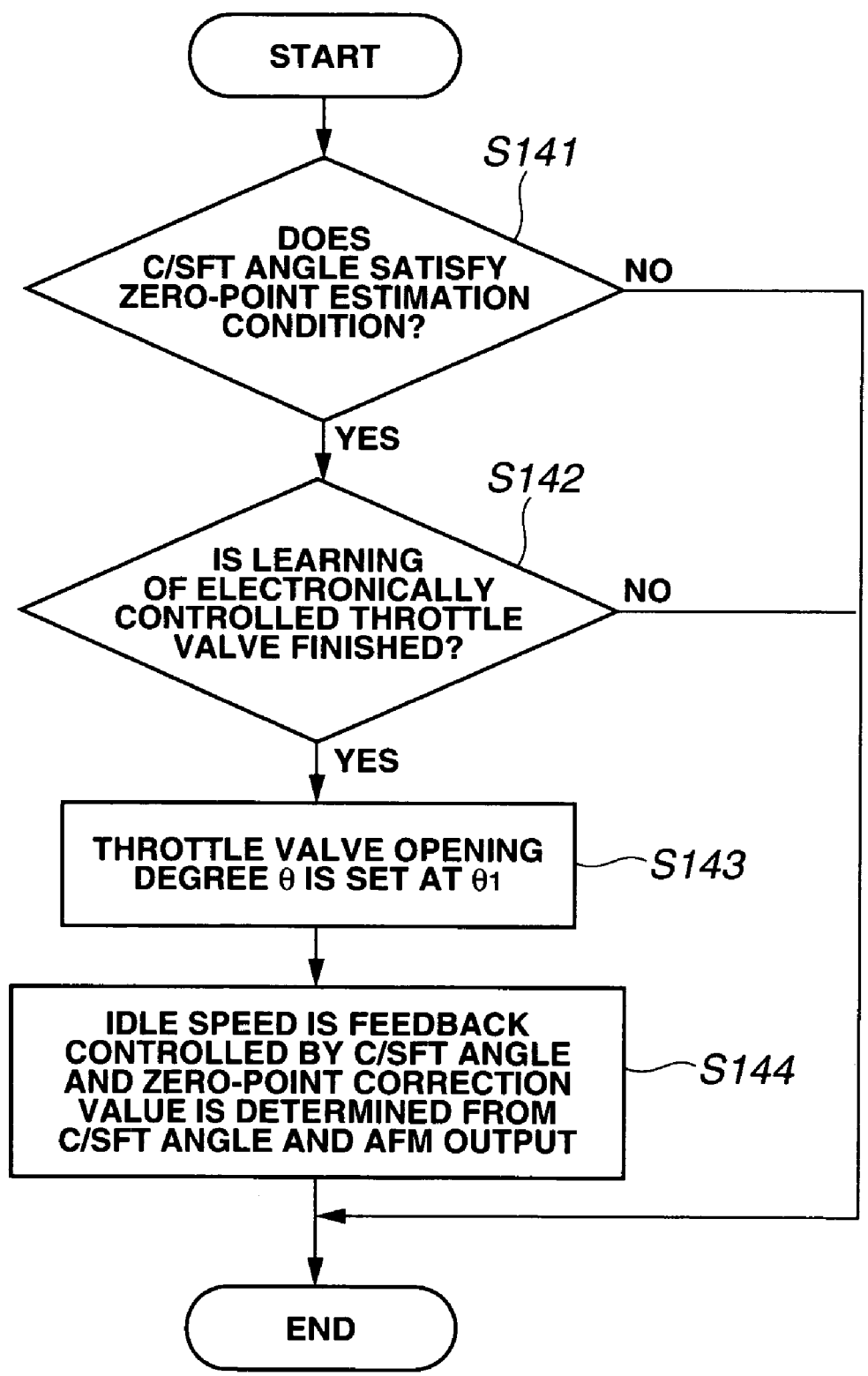
FIG. 11 is a flowchart of a control according to a fourth embodiment of the present invention.
Figure 12:
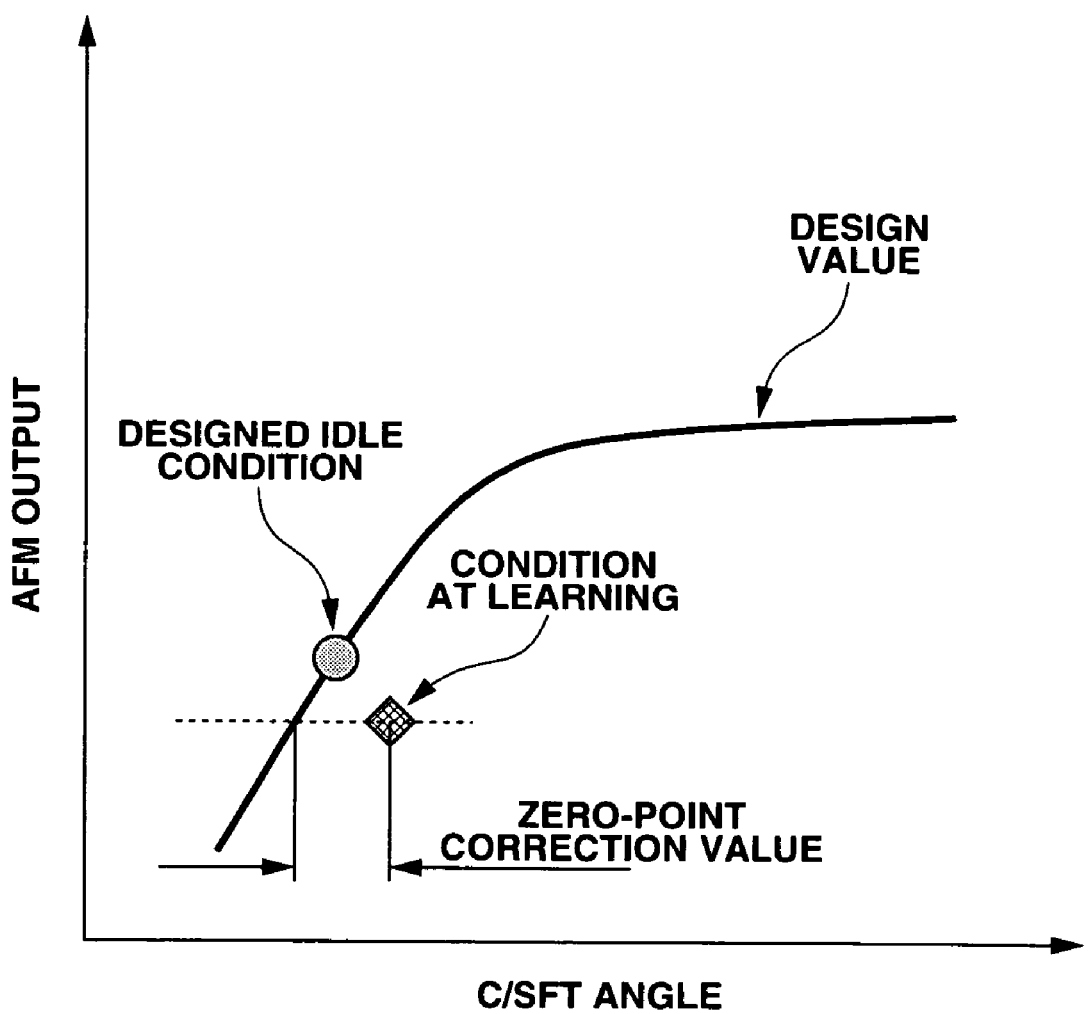
FIG. 12 is a view showing a deviation of a learning value from a design value.

Then, with reference to the flowchart of FIG. 11 and the characteristic view of FIG. 12, a control that is executed in control unit 69 according to the fourth embodiment will be described. This embodiment is configured to perform the estimation and learning of the zero-point of control shaft 12 in first variable valve operating mechanism 11 by using an angle of control shaft 12 and an actual air flow rate that is detected by airflow meter (abbreviated as AFM) 68 when the feedback control at idle is being executed.

The control in steps S141 to S143 is the same as that in steps S101 to S103 of FIG. 6, i.e., in step S141 it is determined whether the zero-point estimation condition is satisfied, in step S142 it is determined whether the learning of electronically controlled throttle valve 67 has been completed, and if completed, in step S143 the opening degree θ of throttle valve 67 is set at a predetermined value θ1. Then, in step S144, the actual engine speed is made to converge to a target idle speed by the feedback control of control shaft 12, and from the angle of control shaft 12 and the output value (air flow rate) of airflow meter 68 a deviation from a design value is obtained as shown in FIG. 12 and learned as a zero-point correction value.

By the above-described control, it becomes possible to estimate the zero-point of control shaft 12 in consideration of an individual variation in the mechanical loss of the engine and therefore the more accurate estimation can be obtained. Further, in such an estimation, use of such a table data shown in FIG. 12 makes it possible to enlarge the zero-point estimation control condition.

Referring to FIGS. 13 to 17, a fifth embodiment will be described.

Figure 13:
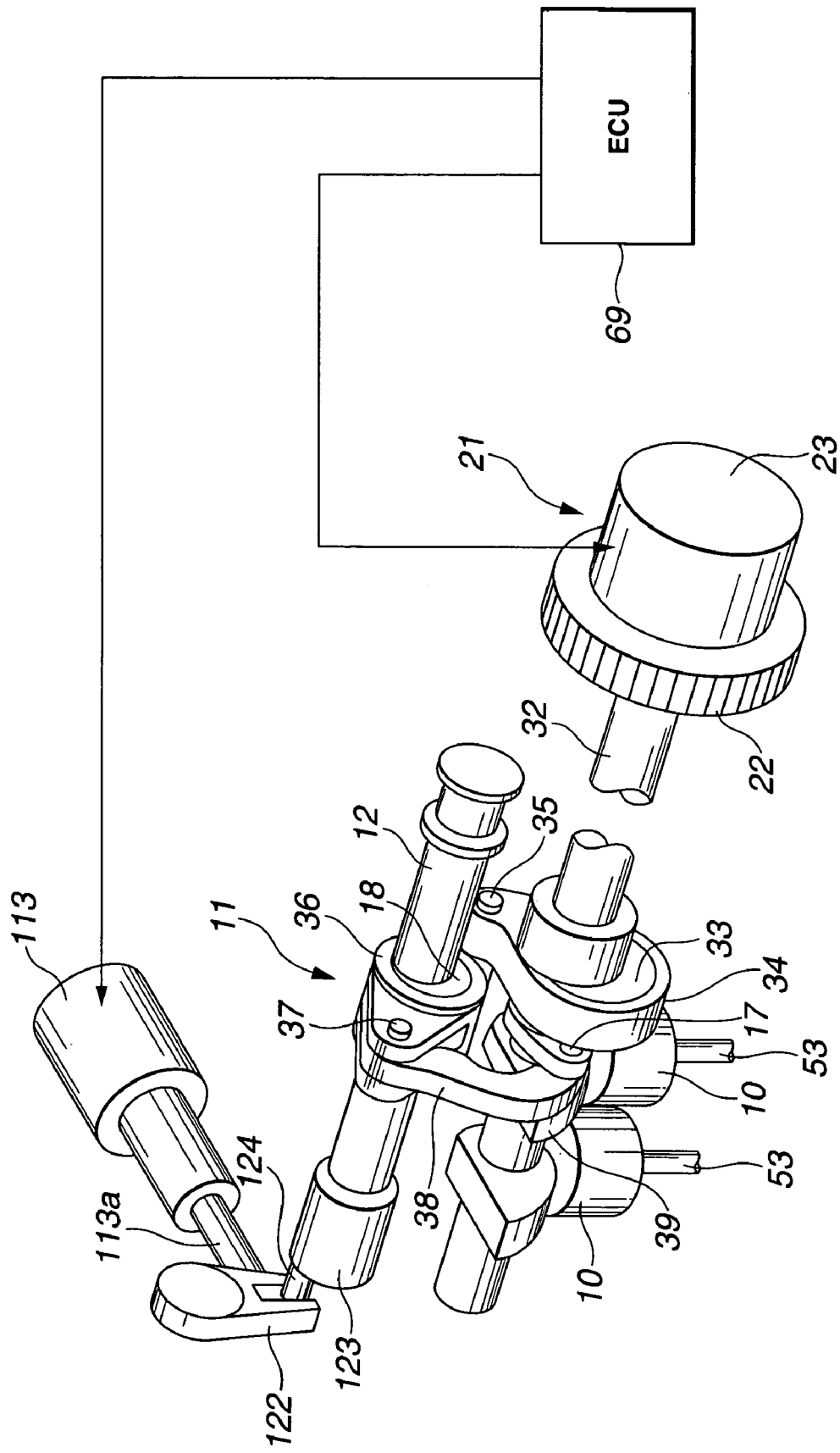
FIG. 13 is a perspective view of a variable valve operating mechanism utilized in an intake control for an internal combustion engine according to a fifth embodiment of the present invention.

FIG. 13 shows a variable valve operating apparatus including a first variable valve operating mechanism 11 and a second variable valve operating mechanism 21 that are substantially the same as those described with reference to FIG. 2 except that control shaft 12 is driven by a different type of actuator 113 so as to be rotatable within a predetermined angular range. Namely, actuator 113 for lift and operation angle control is disposed at an end of control shaft 12. Actuator 113 is, for example, of an electric type and includes a rod 113a movable reciprocally, i.e., axially in the opposite directions, a fork member 122 attached to an end of rod 113a, an actuator arm 123 attached to an end of control shaft 12 and a pin 124 attached to actuator arm 123 and engaged with fork member 122 so as to convert axial movement of rod 113a into rotation of control shaft 12. Actuator 113 causes rod 113a to move axially. Axial movement of rod 113a causes fork member 122 and pin 124 provided to actuator arm 123 to drive control shaft 12 to rotate. The angular position of control shaft 12 is detected by a control shaft sensor (refer to FIG. 2).

Figure 15:
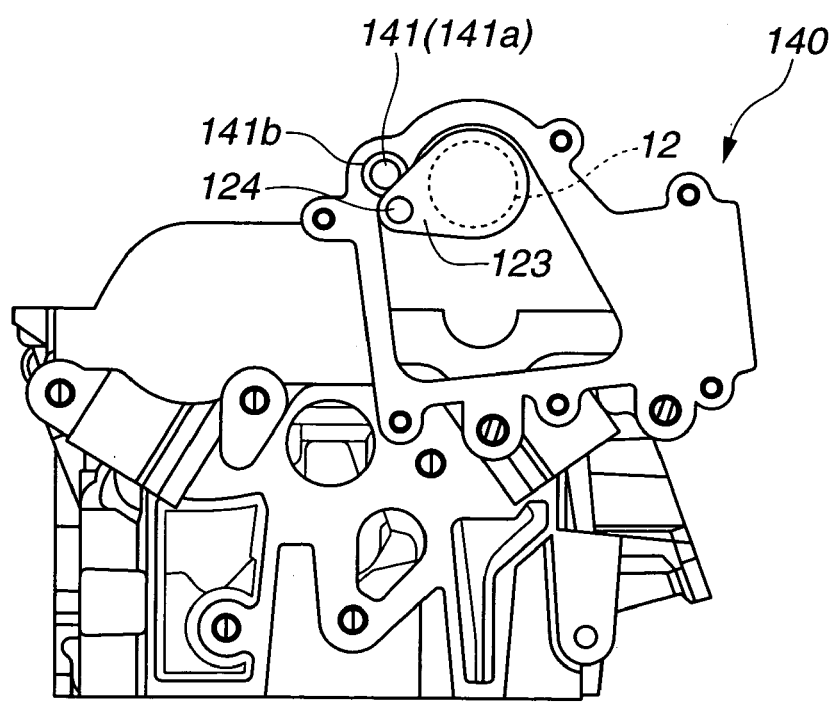
FIG. 15 is a view of an end of a cylinder head.
Figure 16A:
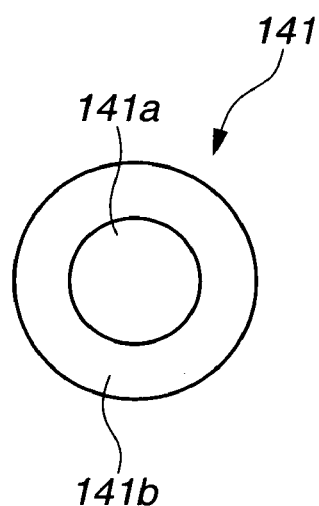
FIG. 16A is a top plan view of a stopper pin.
Figure 16A:
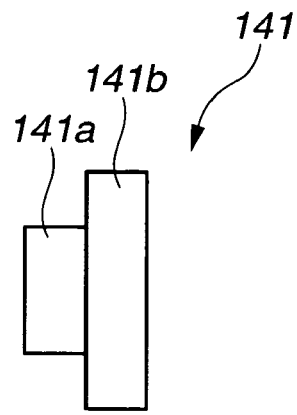
Figure 17:
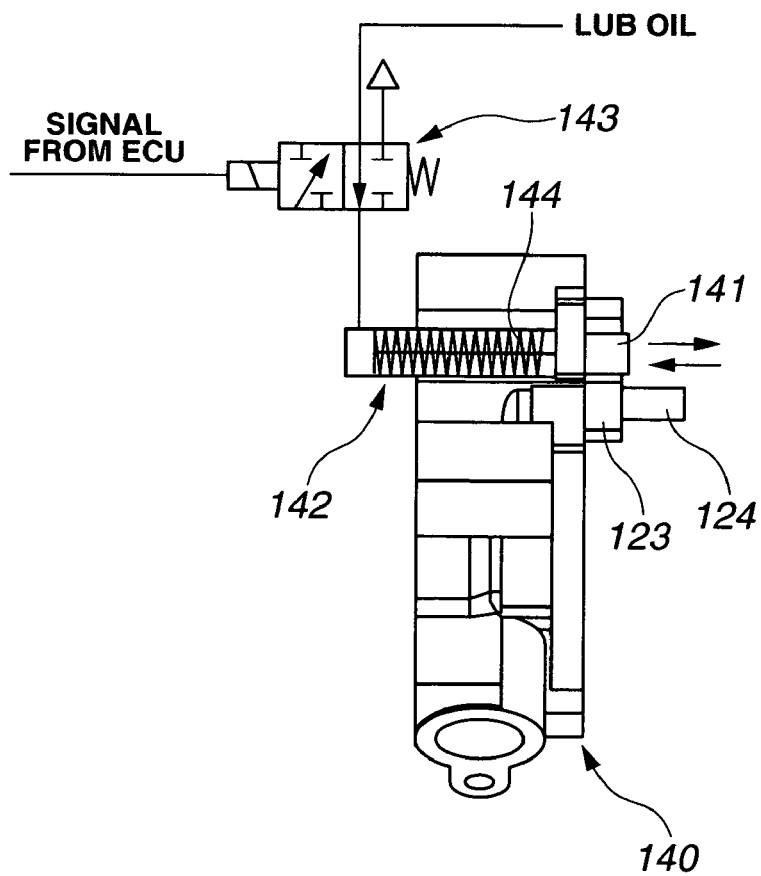
FIG. 17 is a schematic view of a stopper pin drive mechanism.

Referring to FIG. 15, control shaft 12 having at an end actuator arm 123 is rotatably supported by an upper portion of cylinder head 140. Cylinder head 140 is provided with a stopper pin 141 that serves as a stopper mechanism. By abuttingly engaging a side surface of actuator arm 123 with stopper pin 141, further rotation of control shaft 12 in one direction, specifically in the direction to cause the lift and operation angle to decrease is prevented. In this connection, stopper pin 141, as shown in FIGS. 16A and 16B, has a smaller diameter portion 141a that serves as a first stopper position and a larger diameter portion 141b that serves as a second stopper position. Axially movement of stopper pin 141 in the forward or rearward direction relative to cylinder head 140 enables one of smaller diameter portion 141a and larger diameter portion 141b to engage actuator arm 123. Namely, an actual stopper position can be changed. A drive mechanism for driving stopper pin 141 can be such one shown in FIG. 17, though various mechanisms can be used in place thereof. As shown in FIG. 17, the drive mechanism includes a hydraulic cylinder 142 disposed on a rear side of stopper pin 141, an electromagnetic directional control valve 143 for selectively introducing a lubricating oil pressure of an internal combustion engine into hydraulic cylinder 142 and a return spring 144 for always urging stopper pin 141 in the rearward direction, i.e., in the direction toward hydraulic cylinder 142. Supply of hydraulic pressure into cylinder 142 causes stopper pin 141 to move in the forward direction, i.e., in the direction to go away from hydraulic cylinder 142.

Figure 14:
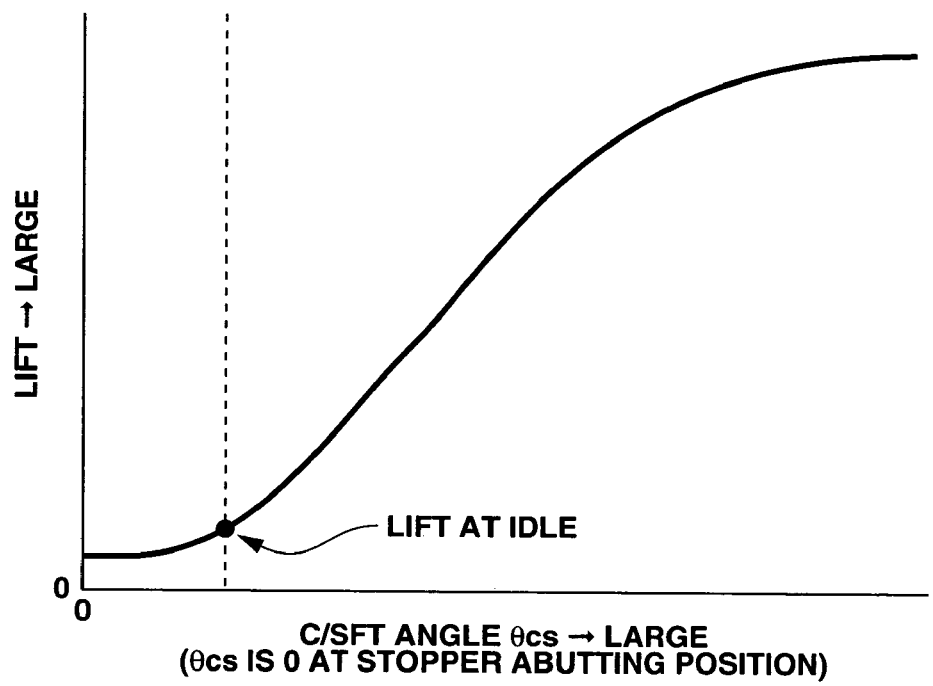
FIG. 14 is a characteristic view showing a relation between lift and operation angle and an angle of a control shaft.

The first stopper position provided by smaller diameter portion 141a corresponds to the zero-point position of an angle θcs of control shaft 12 as shown in FIG. 14. At the zero-point position, the lift and operation angle becomes minimum. However, the zero-point position is outside a usual control range. Further, the second stopper position provided by larger diameter portion 141b corresponds to the lift and operation angle at idle (specifically, at idle after warm-up of the engine), which is shown in FIG. 14 and in other words corresponds to a learning position of lift and operation angle. In the meantime, by setting, in this manner, the lift and operation angle at idle so as to be a little larger than a minimum value of the lift and operation angle that can be actually realized, it becomes possible to attain a necessary intake air amount at idle even if the actual valve lift is varied due to various factors, thus never causing stoppage of the engine at idle due to an insufficient intake air amount.

In the above described structure, stopper pin 141 is held at a retracted position to cause only smaller diameter portion 141a on the forward end side to protrude from cylinder 140 except for the time when a learning is performed. Accordingly, even if control shaft 12 is caused to overshoot due to, for example, a response delay in the control or the like when rotated in the direction to decrease the lift and operation angle, it is assuredly stopped at the predetermined zero-point position and never rotated further.

Further, when a predetermined learning condition is satisfied during idle after warm-up, hydraulic pressure is supplied to hydraulic cylinder 142 by means of electromagnetic directional control valve 143 to hold stopper pin 41 at a protruded position, i.e., to make larger diameter portion 141b protrude into a position corresponding to actuator arm 123 while at the same time driving control shaft 12 in the direction to decrease the lift and operation angle by means of actuator 113 thereby allowing actuator arm 123 to abuttingly engage larger diameter portion 141b. Then, the actual lift and operation angle at this moment, i.e., an actual angular position of control shaft 12 is detected by a control shaft sensor (not shown) and learned. The learning may be performed every time when the engine is in an idle condition or only at first idle or at any other suitable frequency. When the learning is finished, the control of control shaft 12 is returned to a usual control and stopper pin 141 is moved into the retracted position.

In the meantime, stopper pin 141 is not limited to a cylindrical shape but can be formed into various other shapes.

Figure 18:
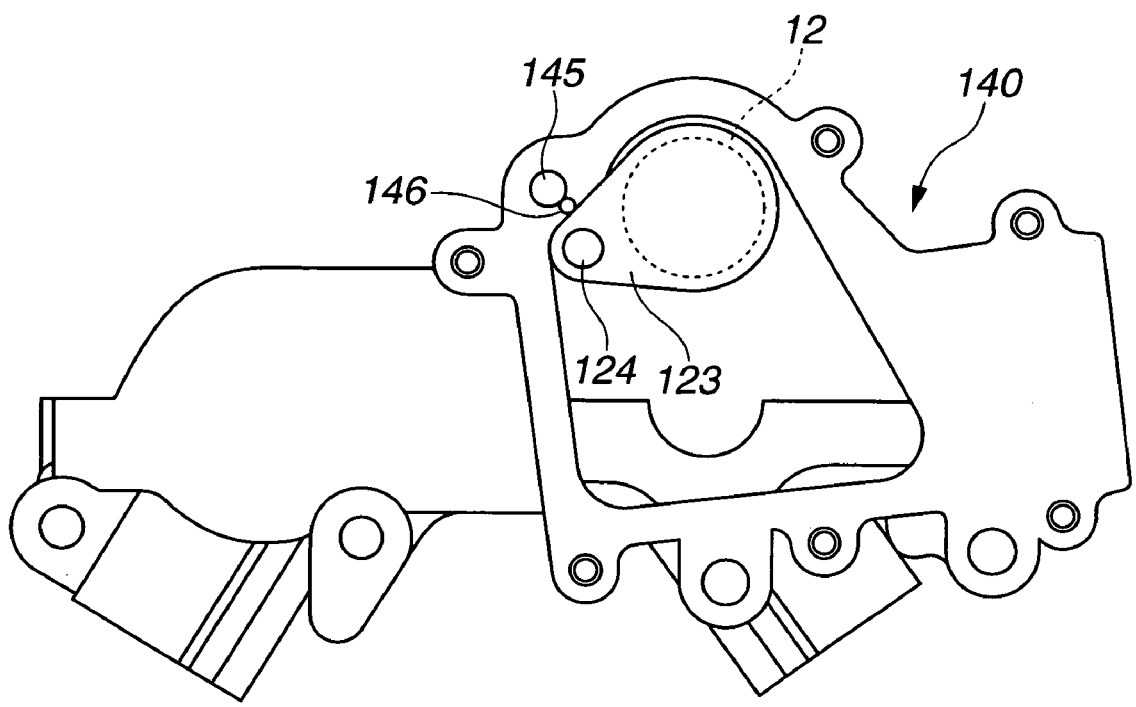
FIG. 18 is a view of an end of a cylinder head and shows a modification using two stopper pins.

FIG. 18 shows a modification of the stopper mechanism. In this modification, cylinder head 140 is provided with a stopper mechanism including a first stopper pin 145 for controlling the first stopper position corresponding to the minimum value of the lift and operation angle and a second stopper pin 146 for controlling the second stopper position corresponding to the lift and operation angle at idle. In this connection, first stopper pin 145 is fixedly attached to cylinder head 140 and always mechanically prevents excessive rotation of control shaft 12 (i.e., rotation beyond the zero-point position in the direction to decrease the lift and operation angle). In contrast to this, second stopper pin 146 is adapted to cooperate with a drive mechanism similar to that shown in FIG. 17 so as to protrude into a protruded position only at the time of learning thereby holding control shaft 12 at the learning position. Namely, second stopper pin 146 is installed on cylinder head 140 for releasable engagement with actuator arm 123.

Figure 19:
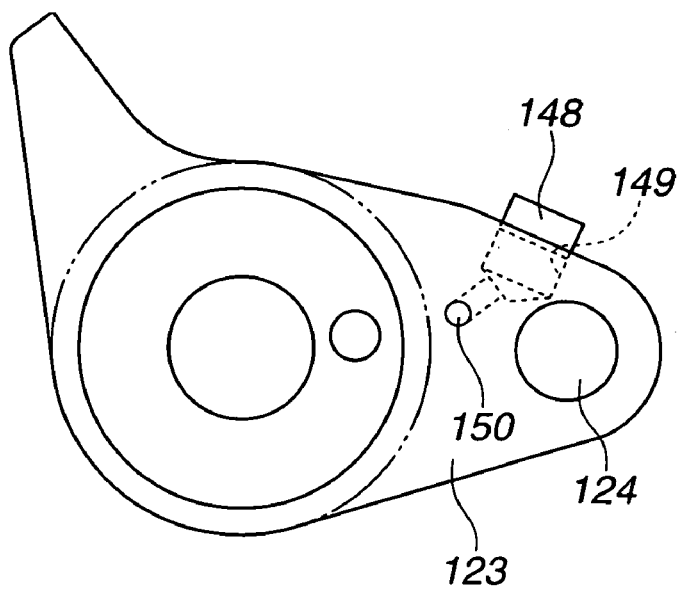
FIG. 19 is a rear view of an actuator arm which is provided with a stopper pin according to a further modification of the present invention.

FIG. 19 shows a further modification of the stopper mechanism. In this modification, actuator arm 123 fixedly attached to an end of control shaft 12 is provided with a stopper pin 148 capable of protruding or retracting, i.e., movable toward and away relative thereto. Stopper pin 148 is slidably fitted in a cylinder 149 formed in actuator arm 123 and moved into a protruded position when hydraulic pressure is supplied to cylinder 149 through an oil passage 150 formed in actuator arm 123. At the protruded position, an end of stopper pin 148 is abuttingly engaged with a mating stopper member (not shown) thereby holding control arm 12 at the learning position at idle. Except for the time when the learning is performed, stopper pin 148 is moved into a retracted position thereby allowing actuator arm 123 itself to abuttingly engage with the mating stopper member and holding control arm 12 at a position corresponding to the minimum value of the lift and operation angle. Namely, stopper pin 148 is installed on actuator arm 123 for releasable engagement with the mating stopper member. Supply and discharge of hydraulic pressure can be performed by an electromagnetic directional control valve similar to that shown in FIG. 17.

From the foregoing, it will be understood that according to the present invention, learning of a controlled condition of a variable valve operating mechanism capable of varying a lift and operation angle of an intake valve continuously can be performed not only at start of an internal combustion engine but during operation of the engine, and a fine lift control of the intake valve at idle can be attained assuredly.

It will be further understood that according to the present invention learning of the lift and operation angle can be performed at increased occasions, thus making it possible to attain a highly accurate lift and operation angle control and therefore a stabler idle.

It will be further understood that according to the present invention, by feedback controlling a lift and operation angle of an intake valve in a structure for variably controlling an intake air amount by varying valve lift characteristics of the intake valve, an idle speed control having a high responsiveness can be realized. Further, by performing estimation and learning of a reference position of the variable valve operating mechanism during the feedback control, it become possible to exclude an influence due an individual variation of the variable valve operating mechanism or the like and make higher the accuracy in idle speed control thereafter. Namely, during idle, the lift and operation angle of the intake valve is controlled so as to be quite small by the variable valve operating mechanism, so that the amount of intake air drawn into a cylinder depends briefly upon the amount of lift. For this reason, by increasing or decreasing the lift and operation angle on the basis of a deviation of an actual engine speed from a target idle speed, feedback control of the idle speed can be attained. Particularly, since the intake air amount is adjusted by the intake valve that is positioned immediately upstream of the cylinder, a highly responsive feedback control can be realized. Further, since by the feedback control, an engine torque attained at a target idle speed is balanced with an actual intake air amount attained by the variable valve operating mechanism, it becomes possible to know the reference position (zero-point in control) of the variable valve operating mechanism that varies a little depending upon an individual variation from the controlled position of the variable valve operating mechanism at that time. Accordingly, by such learning of the reference position, the accuracy in control of the variable valve operating mechanism can be improved.

The entire contents of Japanese Patent Applications P2004-318653 (filed Nov. 2, 2004) and P2004-338286 (filed Nov. 24, 2004) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. An intake control apparatus for an internal combustion engine comprising:
   a variable valve operating mechanism capable of varying a lift and operation angle of an intake valve continuously; and
   a control unit that controls an intake air amount by varying the lift and operation angle of the intake valve in accordance with an operating condition of the engine;
   the control unit including:
   an idle determining section that determines whether the engine is in a predetermined idle condition;
   a feedback control section that feedback controls the variable valve operating mechanism so that an actual engine speed becomes equal to a target idle speed when the engine is in the predetermined idle condition, and
   a reference position estimation section that estimates a reference position of the variable valve operating mechanism on the basis of a controlled position of the variable valve operating mechanism that is feedback controlled by the feedback control section.

2. An intake control apparatus according to claim 1, wherein estimation by the reference position estimation section is performed under a condition where warm-up of the engine is completed.

3. An intake control apparatus according to claim 1, further comprising an intake air amount measuring section that measures the intake air amount, wherein the reference position estimation section performs estimation of the reference position on the basis of the controlled position of the variable valve operating mechanism and an estimation value of the intake air amount.

4. An intake control apparatus according to claim 1, further comprising a vacuum control valve that controls an intake vacuum in an intake passage on an upstream side of the intake valve, wherein the reference position estimation section performs estimation of the reference position under a condition where the intake vacuum is controlled to a predetermined value.

5. An intake control apparatus according to claim 1, further comprising a vacuum control valve that controls an intake vacuum in an intake passage on an upstream side of the intake valve, wherein the reference position estimation section performs estimation of the reference position under the condition where an opening degree of the vacuum control valve is set at a predetermined value.

6. An intake control apparatus according to claim 1, further comprising a vacuum control valve that controls an intake vacuum in an intake passage on an upstream side of the intake valve and a learning section that learns an opening degree of the vacuum control valve, wherein the reference position estimation section performs estimation of the reference position under the condition where the intake vacuum is controlled to a predetermined value if learning of an opening degree of the vacuum control valve is not completed but performs the estimation of the reference position under the condition where an opening degree of the vacuum control valve is fixed at a predetermined value if the learning of the opening degree of the vacuum control valve is completed.

7. An intake control apparatus according to claim 1, further comprising a second variable valve operating mechanism capable of varying a maximum lift phase of the intake valve so that the intake air amount is controlled by varying lift characteristics provided by the first mentioned variable valve operating mechanism and the second variable valve operating mechanism, wherein the reference position estimation section performs estimation of the reference position under the condition wherein the maximum lift phase is most retarded.

8. An intake control apparatus according to claim 1, wherein the internal combustion engine includes a plurality of cylinders that are arranged in a plurality of rows which are provided with the respective variable valve operating mechanism, wherein the control unit further includes a correction section that corrects the controlled position of the variable valve operating mechanism so that the respective variable valve operating mechanisms provide equal valve lift characteristics, and wherein the reference position estimation section performs estimation of the reference position under the condition where correction by the correction section is finished.

9. An intake control apparatus for an internal combustion engine having a variable valve operating mechanism capable of varying a lift and operation angle of an intake valve continuously, the engine being capable of controlling an intake air amount by varying the lift and operation angle of the intake valve in accordance with an operating condition of the engine, the intake control apparatus comprising:
   idle determining means for determining whether the engine is in a predetermined idle condition;
   feedback control means for feedback controlling the variable valve operating mechanism so that an actual engine speed becomes equal to a target idle speed when the engine is in the predetermined idle condition; and
   reference position estimation means for estimating a reference position of the variable valve operating mechanism on the basis of a controlled position of the variable valve operating mechanism that is feedback controlled by the feedback control means.

10. An intake control method for an internal combustion engine having a variable valve operating mechanism capable of varying a lift and operation angle of an intake valve continuously and a control unit that controls an intake air amount by varying the lift and operation angle of the intake valve in accordance with an operating condition of the engine, the intake control method comprising:
   determining whether the engine is in a predetermined idle condition;
   feedback controlling the variable valve operating mechanism so that an actual engine speed becomes equal to a target idle speed when the engine is in the predetermined idle condition; and
   estimating a reference position of the variable valve operating mechanism on the basis of a controlled position of the variable valve operating mechanism that is feedback controlled.

11. An intake control method according to claim 10, wherein the estimating is performed under a condition where warm-up of the engine is completed.

12. An intake control method according to claim 10, further comprising measuring the intake air amount, wherein estimation of the reference position is performed on the basis of the controlled position of the variable valve operating mechanism and a measured value of the intake air amount.

13. An intake control method according to claim 10, wherein the engine further has a vacuum control valve that controls an intake vacuum in an intake passage on an upstream side of the intake valve, and wherein the reference position is estimated under a condition where the intake vacuum is controlled to a predetermined value.

14. An intake control method according to claim 10, wherein the engine further has a vacuum control valve that controls an intake vacuum in an intake passage on an upstream side of the intake valve, and wherein the reference position is estimated under the condition where an opening degree of the vacuum control valve is set at a predetermined value.

15. An intake control method according to claim 10, wherein the engine further has a vacuum control valve that controls an intake vacuum in an intake passage on an upstream side of the intake valve and a learning section that learns an opening degree of the vacuum control valve, and wherein the reference position is estimated under the condition where the intake vacuum is controlled to a predetermined value if learning of the opening degree of the vacuum control valve is not completed and under the condition where the opening degree of the vacuum control valve is set at a predetermined value if the learning of the opening degree of the vacuum control valve is completed.

16. An intake control method according to claim 10, wherein the engine further has a second variable valve operating mechanism capable of varying a maximum lift phase of the intake valve so that the intake air amount is controlled by varying valve lift characteristics provided by the first mentioned variable valve operating mechanism and the second variable valve operating mechanism, wherein the reference position is estimated under the condition wherein the maximum lift phase is most retarded.

17. An intake control method according to claim 10, wherein the engine has a plurality of cylinders that are arranged in a plurality of rows which are provided with the respective variable valve operating mechanisms, the intake control method further comprising correcting the controlled positions of the variable valve operating mechanisms so that the respective variable valve operating mechanisms provide equal valve lift characteristics, wherein the reference position is estimated under the condition where the correcting is finished.

* * * * *